US008494725B2

(12) United States Patent
Zurfluh

(10) Patent No.: US 8,494,725 B2
(45) Date of Patent: Jul. 23, 2013

(54) STABILIZATION OF A MAST FOR VEHICLES AND SHIPS

(75) Inventor: Erwin Alex Zurfluh, Feldmeilen (CH)

(73) Assignee: Thales Suisse SA, Zurich (CH)

( * ) Notice: Subject to any disclaimer, the term of this patent is extended or adjusted under 35 U.S.C. 154(b) by 272 days.

(21) Appl. No.: 13/123,361

(22) PCT Filed: Oct. 2, 2009

(86) PCT No.: PCT/CH2009/000314
§ 371 (c)(1),
(2), (4) Date: Apr. 8, 2011

(87) PCT Pub. No.: WO2010/040237
PCT Pub. Date: Apr. 15, 2010

(65) Prior Publication Data

US 2011/0196581 A1 Aug. 11, 2011

(30) Foreign Application Priority Data

Oct. 10, 2008 (CH) ....................................... 1609/08

(51) Int. Cl.
*G05D 3/00* (2006.01)

(52) U.S. Cl.
USPC ............................................ 701/49; 248/157

(58) Field of Classification Search
USPC .................... 701/49; 248/157, 519, 121, 129, 248/130, 133, 125.8, 127, 149; 414/662–674, 414/686, 695; 212/294, 295, 306–307; 180/2.1
See application file for complete search history.

(56) References Cited

U.S. PATENT DOCUMENTS

| | | | | |
|---|---|---|---|---|
| 4,647,939 | A | 3/1987 | Kolhoff | |
| 4,709,265 | A * | 11/1987 | Silverman et al. | 348/158 |
| 5,922,039 | A | 7/1999 | Welch et al. | |
| 2007/0103366 | A1 | 5/2007 | Park | |
| 2008/0061211 | A1 | 3/2008 | Madsen | |
| 2009/0244279 | A1 * | 10/2009 | Walsh | 348/143 |

FOREIGN PATENT DOCUMENTS

| | | | |
|---|---|---|---|
| DE | 44 05 644 | A1 | 10/1994 |
| EP | 0 107 232 | A1 | 5/1984 |
| WO | 99/04224 | A1 | 1/1999 |
| WO | 2005/099029 | A1 | 10/2005 |

* cited by examiner

*Primary Examiner* — Marthe Marc-Coleman
(74) *Attorney, Agent, or Firm* — Sughrue Mion, PLLC

(57) ABSTRACT

A system and a method are disclosed for stabilization of a mast (3) on a moving carrier, for example a vehicle. An actuator device (6') is connected to the mast and allows the mast (3) to pivot with its longitudinal direction relative to the carrier (2), about at least one pivoting axis. A mast sensor device determines the position of the mast (3) relative to a predetermined absolute spatial direction, and supplies this to an electronic control device, which compares the position of the mast with a predetermined set value and derives a manipulated variable for the actuator device from this, in order to stabilize the longitudinal direction of the mast. A securing device (7) blocks the mast if a predetermined acceleration value is exceeded.

15 Claims, 4 Drawing Sheets

STABILIZATION OF A MAST FOR VEHICLES AND SHIPS

CROSS REFERENCE TO RELATED APPLICATIONS

This application is a National Stage of International Application No. PCT/CH2009/000314 filed Oct. 2, 2009, claiming priority based on Swiss Patent Application No. 01609/08 filed Oct. 10, 2008, the contents of all of which are incorporated herein by reference in their entirety.

TECHNICAL FIELD

The present invention relates to a system for stabilization of the orientation of a mast on a moving carrier, for example a land vehicle or a marine vessel, and to a corresponding method.

PRIOR ART

Transportable, extendable telescopic masts for reconnaissance vehicles are known from the prior art, which allow a payload to be positioned at a variable height above the vehicle. In particular, the payload may be a sensor head with various monitoring and communication devices, for example with a communication antenna, an antenna of a surveillance radar, one or more cameras etc. A mast such as this is specified, for example, in WO 2005/099029.

Normally, the carrier vehicle is stationary and does not move as long as the mast is extended. Before the carrier vehicle is moved, the mast is retracted and is then stowed, e.g., by folding it down onto the roof of the carrier vehicle, or by lowering it into a stowage compartment in the carrier vehicle. However, in certain applications, it may be desirable to also move the carrier vehicle with the mast extended, while maintaining the full functionality of the sensor head. For this purpose, it is necessary to keep the spatial orientation of the sensor head, in particular its alignment relative to the vertical, stable despite the vehicle movements. Similar problems also occur in vehicles that are not land-based, in particular marine vessels.

It is known from marine applications for a payload such as a radar antenna to be actively stabilized with respect to rolling and pitching movements of the marine vessel. For this purpose, the payload is located on a moving platform which is stabilized passively (for example by gyro forces) or actively by an appropriate control loop with sensors and actuators. Various mechanical arrangements have been proposed for this purpose, for example in U.S. Pat. No. 5,922,039 or U.S. Pat. No. 4,647,939. Control methods for active stabilization of a platform of such a type have been proposed, for example, in WO 99/04224 or EP 0 107 232. In these designs and methods, the stabilized platform supports the payload directly. However, because of their weight and their size, arrangements such as these are generally unsuitable for stabilization of a payload on a telescopic mast.

A device for orientating a mast on a carrier, wherein orientation, as the case may be, can take place automatically, is known from US 2008/0061211. This device can however absorb only limited accelerating forces and is not suitable for automatic orientation during vehicle operation.

SUMMARY OF THE INVENTION

It is therefore an object of the present invention to provide an apparatus which allows the orientation of a mast to be stabilized when the mast is located on a moving carrier and is therefore subject to movements with substantial acceleration values.

The present invention therefore proposes a system for stabilizing a mast on a movable carrier, the system having the following features:

- a mast which defines a longitudinal direction;
- a mast support which is designed to support the mast on the carrier pivotably about at least one pivoting axis;
- an actuator device which is connected to the mast and is designed to pivot the mast with its longitudinal direction relative to the carrier about the at least one pivoting axis;
- a mast sensor device which is designed to determine the longitudinal direction of the mast relative to a predetermined absolute spatial direction;
- an electronic control device which is designed to receive direction signals from the mast sensor device, to compare them with a predetermined set value for the longitudinal direction of the mast and to derive a manipulated variable from this for the actuator device, in order to stabilize the longitudinal direction of the mast with respect to the set value; and
- a securing device for monitoring acceleration values of the mast and/or of the carrier and for blocking the mast with respect to pivoting movements if a predetermined acceleration value is exceeded.

In this manner it becomes possible to secure the mast and to thereby relieve the actuator device if the carrier and thereby also the mast experience very rapid changes in their movements and, along with these changes, high acceleration values. If the carrier is, for example, a terrestrial vehicle, the securing device can be used to rapidly relieve the actuator device from the resulting inertial forces if the vehicle is rapidly decelerated. Thereby the actuator device can be optimized to change the longitudinal direction of the mast sufficiently rapidly to track changes in the orientation of the mast, without the need for the actuator device to absorb all forces acting on the mast under all operating conditions.

In particular, the securing device may be designed as a cable run system. This comprises at least one securing cable which extends between the mast and the carrier and is preferably connected to the mast above the mast support, and at least one cable guide device on which the securing cable is guided and which blocks the cable if a predetermined acceleration value, which occurs on the mast and/or the carrier, is exceeded, such that further pivoting of the mast is prevented. In particular, an electrically operable clutch or a mechanical clutch may be used for this purpose. The cable guide device then preferably has at least one cable drum with a spring element, with the cable drum being designed to be connected to the carrier and in which case the cable can be prestressed by means of the spring element. By way of example, the spring element may be a spiral spring.

In this apparatus and in this method, the mast is preferably stabilized not only about a single pivoting axis but about two preferably mutually orthogonal pivoting axes. For this purpose, the mast support is designed such that it allows a pivoting movement of the mast about two mutually orthogonal pivoting axes. The mast sensor device is designed to detect the longitudinal direction of the mast with respect to both pivoting axes, and the actuator device is designed to pivot the mast about both pivoting axes. The controller is then correspondingly designed to be two-dimensional, that is to say it receives a two-dimensional controlled variable and produces a two-dimensional manipulated variable, or there are two one-dimensional controllers.

The mast support may, in particular, comprise a universal joint or a ball joint. It is preferably designed such that it blocks rotation of the mast about its longitudinal direction. The mast is preferably a telescopic mast with a plurality of mast segments which are movable with respect to one another along the longitudinal direction. Masts such as these are known in a wide range of embodiments from the prior art. The invention is, however, also applicable to integral masts.

The mast sensor device preferably comprises at least one gyro (gyroscope). This may be a mechanical gyro, an optical gyro or a vibration gyro. The gyro is preferably drift-compensated in a known manner.

In addition, the system may comprise a carrier sensor device which is designed to detect the orientation of the carrier with respect to the predetermined spatial direction. The control device is then designed to additionally receive direction signals from the carrier sensor device, and to take them into account in the determination of the manipulated variable. This allows more rapid and/or more stable control to be achieved, particularly after interruptions in the control process.

In a first possible embodiment, the actuator device has at least one cable run system. This comprises a load cable, which extends between the mast and the carrier and for this purpose is preferably connected to the mast above the mast support, and at least one cable drive, which is designed to drive the load cable to move in order in this way to pivot the mast with its longitudinal direction relative to the carrier.

The securing device may comprise a clutch of the cable drive which blocks the load cable if a predetermined acceleration is exceeded. However, a separate securing device is preferably provided, as has been described above.

According to a second possible embodiment, the actuator device has at least one spindle drive. This spindle drive comprises a threaded spindle and a drive device which is designed to rotate the threaded spindle and a threaded nut relative to one another, with the rotation resulting in the mast being pivoted relative to the carrier.

The system according to the invention is preferably used on a terrestrial vehicle or a marine vessel as a carrier, and its dimensions and the nature of its design are accordingly specifically matched to a purpose such as this. The invention is accordingly also directed at a vehicle, in particular a terrestrial vehicle or marine vehicle, with a system such as this. The vehicle typically defines a vehicle longitudinal direction by means of its main direction of propagation, and the securing device is preferably designed to block the mast at least with respect to pivoting movements along the vehicle longitudinal direction if a predetermined acceleration value is exceeded.

According to a further aspect of the present invention, a method for active stabilization of a mast, in particular, a telescopic mast, is provided.

A method according to the invention comprises, in particular, the following steps:

- supporting the mast on the carrier by means of a mast support such that the mast can pivot with respect to the carrier about at least one pivoting axis;
- determining the longitudinal direction of the mast relative to a predetermined absolute spatial direction;
- determining a manipulated variable for an actuator device by means of a closed-loop electronic control device which has as input variables at least the determined longitudinal direction of the mast and a predetermined set value for the longitudinal direction of the mast;
- pivoting the mast by means of an actuator device, which is connected to the mast and receives the manipulated variable from the control device, in order to stabilize the longitudinal direction of the mast relative to the set value;
- monitoring acceleration values of the mast and/or the carrier;
- blocking the mast with respect to its pivoting movements if a predetermined acceleration value is exceeded.

The blocking can be achieved by means of a securing device as described above, or in some other manner.

BRIEF DESCRIPTION OF THE DRAWINGS

Preferred embodiments of the invention will be described in the following with reference to the drawings, in which.

DESCRIPTION OF PREFERRED EMBODIMENTS

Figure 1:
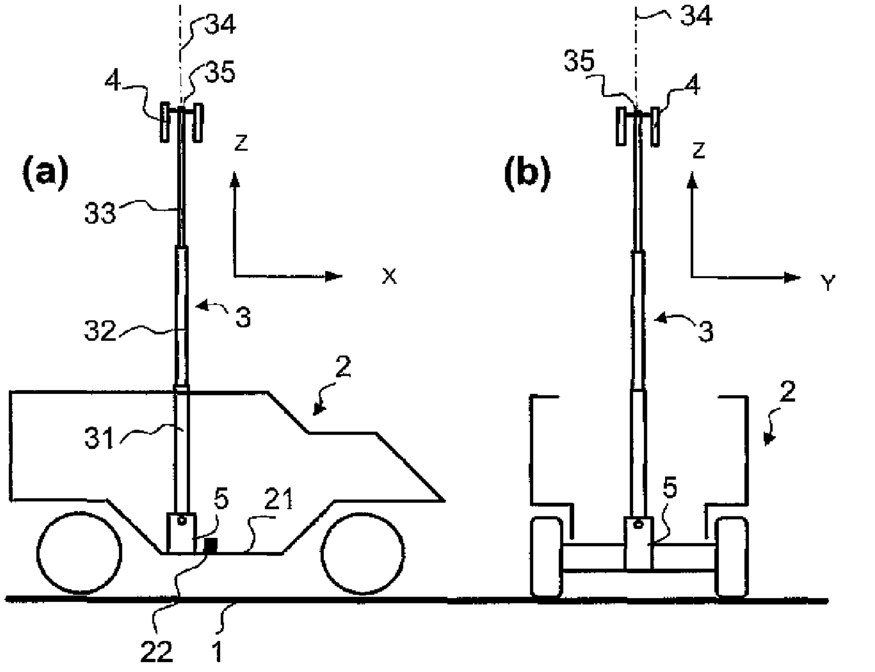
FIG. 1 shows a highly schematic outline sketch of a vehicle with a telescopic mast fitted in it, in order to illustrate the indication of directions used in this document.

A vehicle 2 with a telescopic mast 3 fitted in it is illustrated schematically in FIG. 1. The fundamental design of a stabilization system according to the invention as well as the indication of directions used in this document will be explained with reference to this Figure.

With its chassis 21, the vehicle 2 defines a vehicle longitudinal axis, which is referred to as the X direction (FIG. 1(*a*)). The vehicle lateral axis is referred to as the Y direction (FIG. 1(*b*)). The vehicle vertical axis, which is referred to as the Z direction, runs at right angles to these two directions. The X, Y and Z directions together form a vehicle-fixed coordinate system.

The telescopic mast 3 is formed from a plurality of mast segments, in the present example three mast segments 31, 32 and 33. Depending on the design of the telescopic mast, there may, of course, also be more or less mast segments (in practice generally four or more). The mast segments can be moved with respect to one another along a longitudinal axis 34. Any suitable mechanism may be used for this purpose, as is known from the prior art, for example a cable run mechanism as in the already mentioned WO 2005/099029 or a suitable spindle drive.

The uppermost, in this case the third, mast segment 33 is fitted with a payload 4. In particular, this may be a communication antenna, a radar antenna, an optical sensor or any other desired form of payload as is normally used on telescopic masts in reconnaissance vehicles. It is self-evident that the present invention is not restricted to a specific type of payload.

The first, lowest mast segment 31 is held in a mast support 5, which is rigidly connected to the chassis 21 of the vehicle 2. The mast support 5 allows pivoting movements of the longitudinal axis 34 of the mast 3 both about the vehicle longitudinal axis X and about the vehicle lateral axis Y. For this purpose, the mast support may, for example, be in the form of a universal joint or a ball joint, as is well known from the prior art. If the mast support is in the form of a ball joint, any torsional movement about the mast longitudinal direction 34 is preferably blocked in the mast support, for example by a lug which engages in a corresponding groove in the lowest mast segment 31. The attachment point of the mast to the vehicle is preferably located at as low a level and as close to the centre of the vehicle as possible. When the orientation of the vehicle changes, the lateral forces acting on the mast support are minimized in this manner.

In order to detect the orientation of the mast, a mast sensor device 35 is provided and, in the present example, is fitted to the uppermost end of the mast, but may also be fitted to any other desired mast segment. The mast sensor device preferably allows direct detection of the orientation of the mast relative to the field of gravity of the earth, and is provided with a device in order to stabilize any drift which may occur with respect to the measurement axes relative to the gravitational field. By way of example, this sensor device may comprise a mechanical gyro system (gyroscope), as has been known for a long time from the prior art. Alternatively, so-called optical gyros may also be used, as are likewise known from the prior art. Such optical gyros are frequently also referred to as laser gyros and, for example, make use of ring lasers in which interference is observed between two circulating light waves with opposite circulation directions. Gyros such as these are available, for example, from Honeywell International Inc., Morristown, N.J., USA. Fiber-optic gyros are likewise known, and are available, for example, under the type designation DSP-3000 from KVH Industries, Inc., Middletown, R.I., USA. According to a further alternative embodiment, the mast sensor device may also comprise a so-called vibration gyro, in which an oscillating system is used and the effect of the Coriolis force on this oscillating system during movement of the mast sensor device is measured. Vibration gyros such as these have also been known for a long time. As will become directly evident in the following text, the specific configuration of the sensor device for detection of the orientation of the mast 3 is not important for the present invention.

In order to allow the extended mast to be used while driving, in more general terms in the event of changes in the orientation of the vehicle 2, it is proposed that the mast be stabilized with its longitudinal direction relative to a predetermined absolute spatial direction, in particular the vertical direction that is determined by the gravitational field of the earth. In this stabilization process, angular accelerations which are caused by a movement of the vehicle are compensated for by means of suitable actuators. A number of examples of actuator devices will be discussed in the following.

Figure 2:
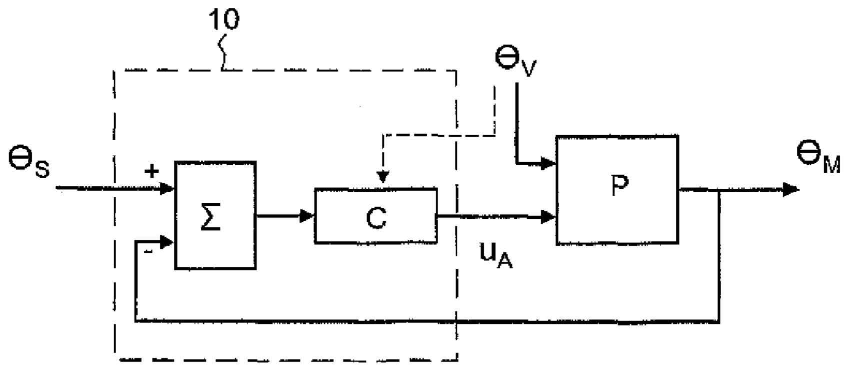
FIG. 2 shows a schematic illustration of a control device for stabilization of a mast.

The mast is stabilized by means of a control device, the fundamental principle of which will be known to a person skilled in the art. One suitable control loop for a single degree of freedom is illustrated by way of example in FIG. 2. The vertical ($\theta_S$=0) which is predetermined by the direction of the gravitational field of the earth is used as a reference variable (set value) $\theta_S$. In contrast, the actual orientation of the mast $\theta_M$ (that is to say the tilt angle of the mast relative to the vertical about a predetermined axis in the X-Y plane), as has been determined by the mast sensor device 35, is used as a controlled variable of the system. Both variables are supplied to an electronic control device 10. The difference between these variables is formed in a unit Σ, and is supplied to a controller C which determines a manipulated variable $u_A$ for an actuator device. The actuator device forms a part of a controlled system P on which the inclination $\theta_V$ of the vehicle acts as a disturbance variable. In the end, the controlled system leads to a change in the controlled variable $\theta_M$, which is in turn supplied to the control device 10.

Any desired suitable controller as is known from the prior art can be used as the controller C, in the simplest case, for example, a P, PI, PD or PID controller. The controller may be designed using analogue or digital electronics. It is preferably designed using digital electronics, with the measurement variables being converted to a binary format by suitable analogue/digital converters (ADC). In particular, the controller may comprise a suitable digital signal processor or a general purpose computer on which the actual control algorithm is implemented in software. The output of the manipulated variables, that is to say the drive signals for the actuators, can be provided by suitable digital/analogue converters (DAC) or by direct digital drive types, such as pulse width modulation. Measures such as these are familiar to a person skilled in the art.

While the control scheme for a single degree of freedom (a single pivoting angle about a single axis) has been described above, it is self-evident that a control system such as this can in any case also be generalized to two degrees of freedom (pivoting movements both about the X axis and the Y axis or about any two mutually orthogonal axes on the X-Y plane). In the simplest case, separate control devices for the pivoting movements about the two axes are used for this purpose. Instead of this, however, it is also feasible to use a suitable MIMO controller (MIMO=Multiple In, Multiple Out) which receives the pivoting angles about both axes as a two-dimensional controlled variable and, in a corresponding manner, produces a two-dimensional manipulated variable in order to drive two actuators. One example in which a MIMO controller such as this is particularly advantageous will be discussed in the following.

Various exemplary embodiments of the mechanical design of suitable actuator devices will be discussed in the following.

Figure 3:
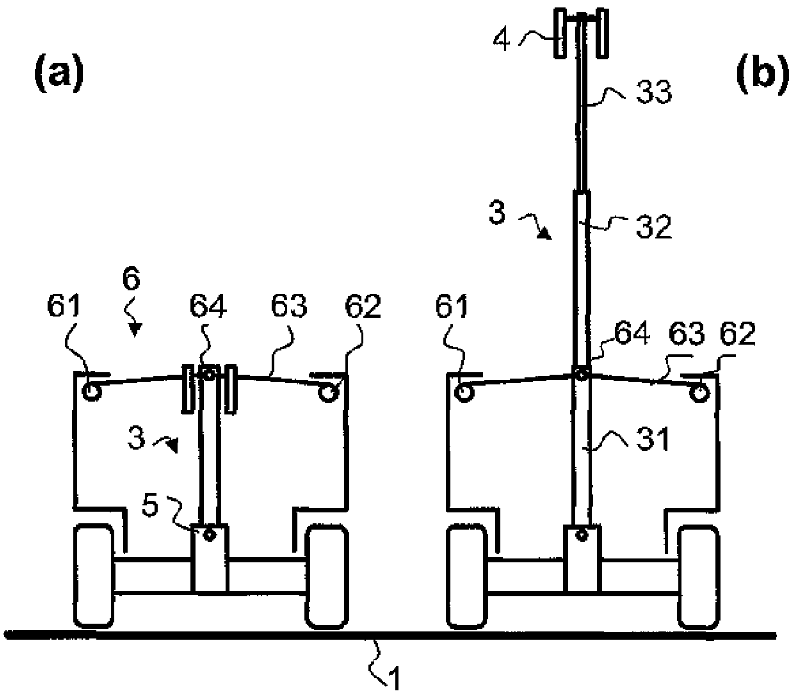
FIG. 3 shows a highly schematic outline sketch of a vehicle with a stabilized telescopic mast fitted in it, in a retracted position (view (a)) and an extended position (view (b)), according to a first embodiment.
Figure 4:
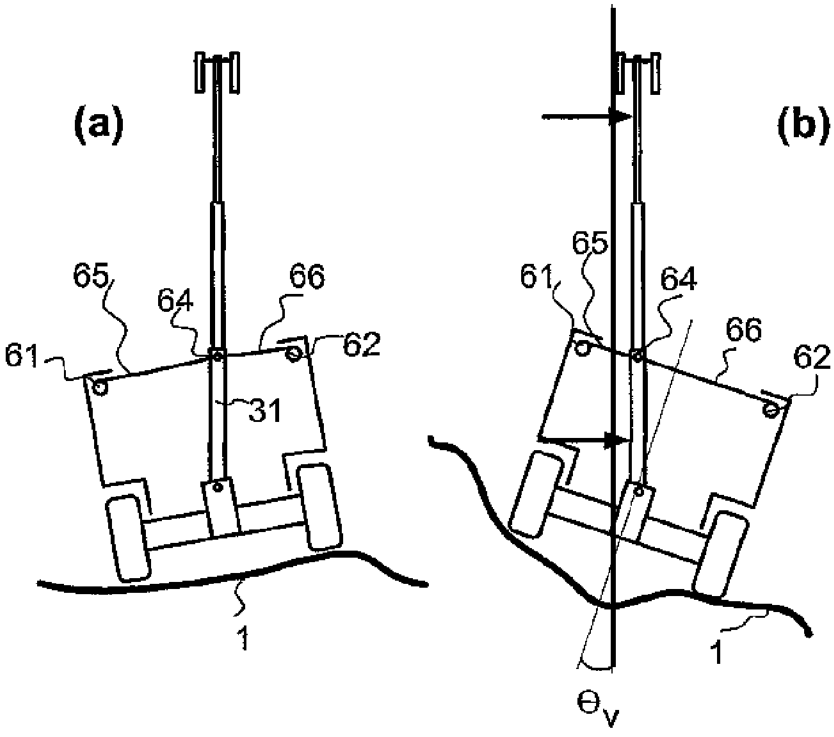
FIG. 4 shows a highly schematic outline sketch of the vehicle shown in FIG. 3 in order to illustrate the stabilization of the telescopic mast with respect to movements about the longitudinal axis (rolling movements)
Figure 5:
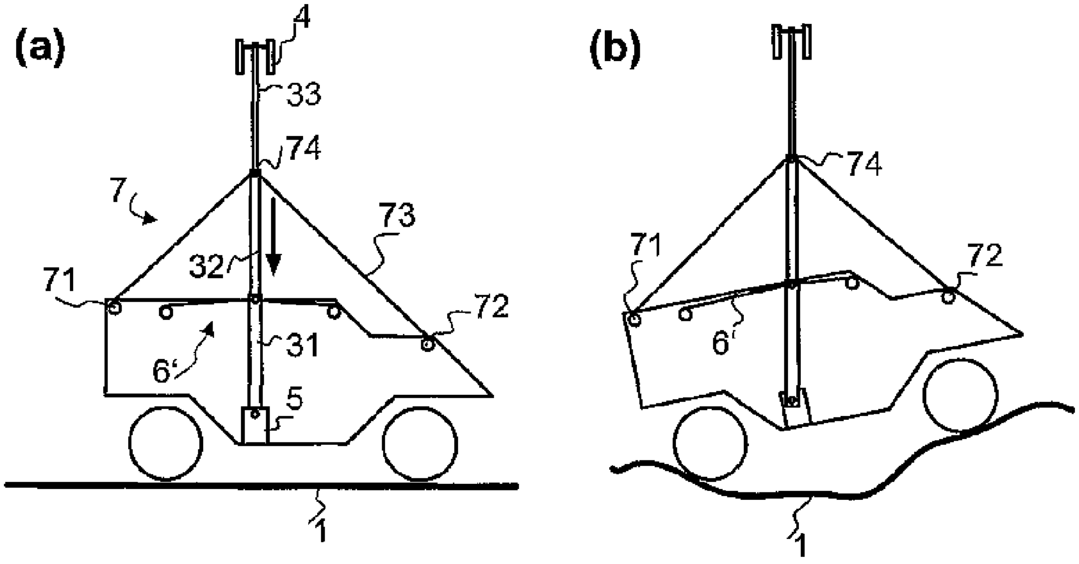
FIG. 5 shows a highly schematic outline sketch of the vehicle shown in FIG. 3 in order to illustrate the stabilization of the telescopic mast with respect to movements about the lateral axis (pitching movements)

A first exemplary embodiment, with electrically driven cable runs, is illustrated in FIGS. 3 to 5. In this exemplary embodiment, at least one cable run system 6 and 6' is provided in the vehicle lateral direction and in the vehicle longitudinal direction, respectively. Each of the two cable run systems comprises two cable drives 61, 62. A load cable 63, for example a steel cable, is tensioned between the cable drives and is connected at an attachment point 64 to the telescopic mast 3, in this case to its first mast segment 31. The cable drives in the present example are in the form of cable drums driven by an electric motor, on which the opposite ends of the load cable are wound up. The length of a first cable section 65 between the first cable drive 61 and the attachment point 64 can be varied with respect to the length of a second cable section 66 between the attachment point 64 and the second cable drive 62 by operation of the cable drives, as is illustrated in FIG. 4 for movements about the vehicle longitudinal axis (rolling movements, referred to as rolling in the case of marine vessels). This makes it possible for the orientation of the mast always to be stabilized along the vertical, irrespective of the orientation of the vehicle.

Instead of a cable run system with two cable drums, it is also feasible to use an endless cable system. In this case, the endless load cable, which in this case is also preferably in the form of a steel cable, is prestressed by a tensioning apparatus and is driven by a single cable drive, as is known per se from the prior art, along its longitudinal direction.

Considerable forces can occur in the event of acceleration and braking processes, particularly in the vehicle longitudinal direction, and in some circumstances, these may exceed the load capability of the relevant cable run system 6', in particular of its cable drives. In order to cope with forces such as these, an optional securing device 7 is proposed which, in principle, is constructed in a similar manner to the cable run systems 6, 6', and is illustrated in FIG. 5.

The securing device comprises a first tensioning apparatus 71 and a second tensioning apparatus 72. In the present example, these are in the form of cable drums which are prestressed by spiral springs. A securing cable 73 is stretched between the tensioning apparatuses 71, 72 and is connected to the telescopic mast 3, in the present example to its second mast segment 32, at an attachment point 74. The tensioning apparatuses 71, 72 are prestressed such that they keep the securing cable 73 stretched in any orientation which the mast assumes during normal operation. Each tensioning apparatus is equipped with a blocking device in the form of an electrically operable clutch. During normal operation, this clutch is disengaged, and the securing cable 73 is wound up and unwound without the use of any drive in this way, when changes occur in the orientation of the mast 3. An acceleration sensor which is not illustrated in the drawings but measures its own acceleration in the longitudinal direction is connected to the vehicle or to the mast. If a previously defined acceleration value is exceeded, the clutches of the securing device are blocked, and action is taken at the same time in the control device 10 such that there is no drive for the actuators, that is to say the controller is stopped, and its output is set to zero. This results in the mast being held in its most recent orientation relative to the vehicle. The clutches are disengaged again only when the acceleration in the vehicle longitudinal direction has fallen back below a predetermined acceleration value, and the control device 10 is reactivated.

The securing device may, of course, also be in a different form to that in the present exemplary embodiment. For example, an arrangement with an endless, prestressed securing cable can also be used for the securing device, with the securing cable being guided with essentially no force during normal operation, and being blocked relative to the vehicle chassis by means of a blocking apparatus when the predetermined acceleration value is exceeded. Securing devices designed in a totally different manner than with cable runs are also conceivable.

Instead of electrically operable clutches, purely mechanically acting clutches can also be provided which engage automatically when a predetermined acceleration is exceeded, for example as is known from motor vehicle safety belts.

A securing device such as this may be provided, of course, not just in the longitudinal direction but also in the lateral direction. It is also feasible, for example, to arrange two such securing devices crossed over and diagonally with respect to the vehicle chassis.

Alternatively, suitable clutches can also be provided directly in the cable drives 61, 62 of the cable run system 6', which means that there is no need for a separate cable run system for the securing device. However, this results in the design of the cable run system 6' being more complex.

While, in the present exemplary embodiment, the cable drives on the cable run system and/or the blocking devices on the securing device are each connected to the vehicle chassis 21, it is also feasible for the respective ends of the cables 63 and/or 73 to be fixed to the vehicle chassis and for a suitable drive device and/or a blocking device to be arranged appropriately on the mast. However, it is preferable for these devices to be arranged to be stationary with respect to the vehicle chassis, as in the present exemplary embodiment, in order to keep the weight borne by the mast as low as possible.

It is self-evident that the securing device discussed above can also be used with other actuator devices than the cable run system shown in FIGS. 3 to 5, and is completely independent of the nature of the actuator device.

Figure 6:
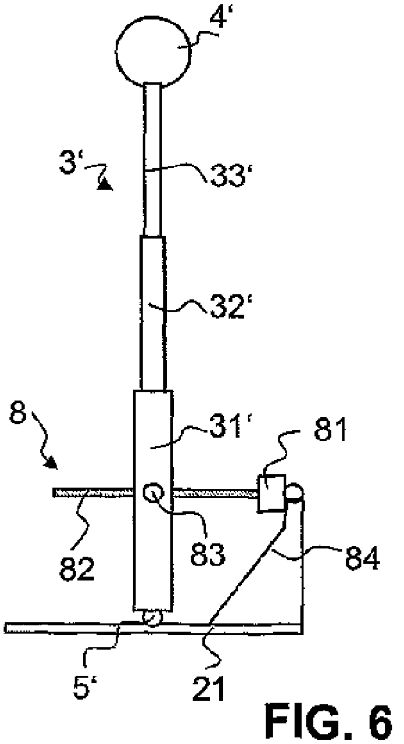
FIG. 6 shows a highly schematic outline sketch of a stabilization device for a telescopic mast according to a second embodiment.
Figure 7:
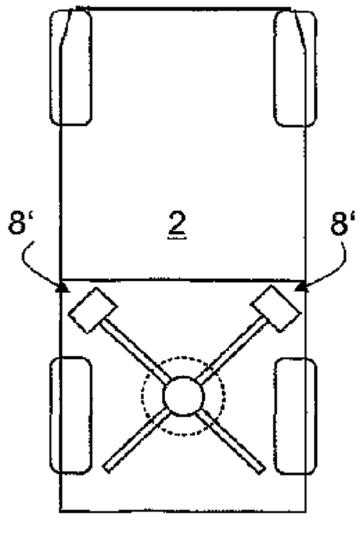
FIG. 7 shows a highly schematic outline sketch of one possible arrangement of a stabilization device such as this in a vehicle.
Figure 8:
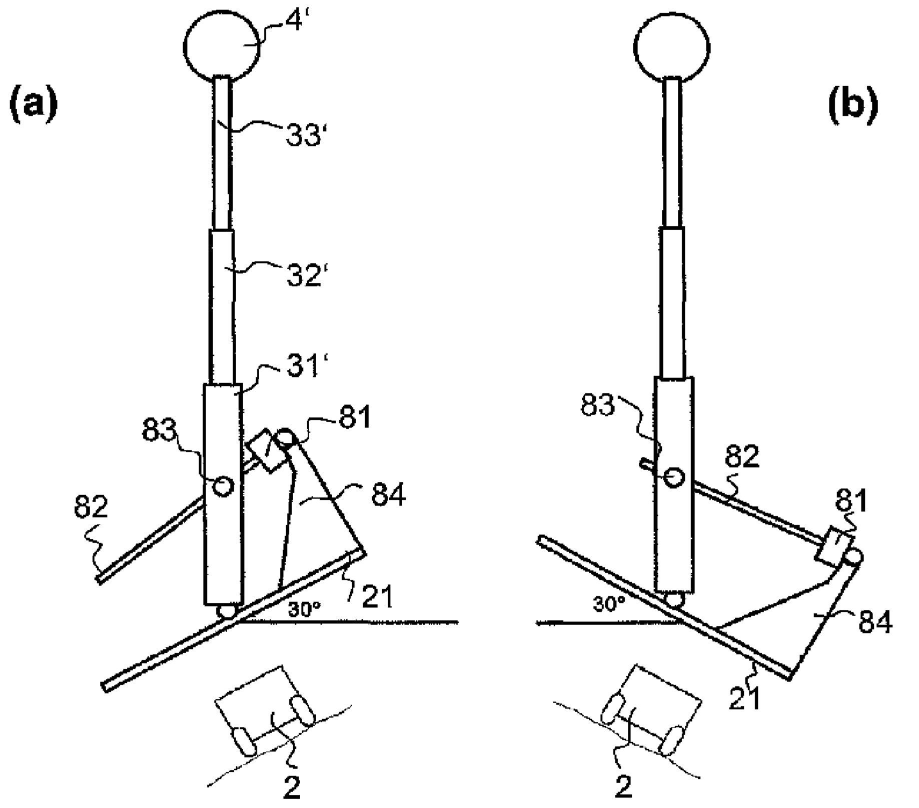
FIG. 8 shows a highly schematic outline sketch in order to illustrate the method of operation of the stabilization device according to the second embodiment.

A second exemplary embodiment for the actuator device is illustrated in FIGS. 6 to 8. In this case, two linear drives are provided, which are arranged orthogonally with respect to one another and can produce tensile and compressive forces equally well. This type of technical embodiment in particular allows the mast to be arranged in a simpler form in the rear area of a vehicle than is the case with the embodiment with cable runs, as discussed above.

The fundamental principle of the linear drive that is used is illustrated in FIG. 6. In this example, the mast 3' is once again in the form of a telescopic mast with a first section 31', section 32' and a third section 33', which supports a payload 4'. In this example, the mast is mounted via a ball joint as a mast support 5' on the chassis 21 of the vehicle 2. A support 84 is likewise connected to the chassis 21, on which support 84 a drive device 81 in the form of an electric motor with a spindle drive is fitted via a bearing which can pivot. The motor is used to drive a threaded spindle (threaded rod) 82 to rotate about its longitudinal axis. The threaded spindle 82 is connected to a threaded nut which is located in the interior of the lowest section 31' of the mast 3' where it is mounted in a support 83 such that it can pivot. When the threaded spindle 82 is now caused to rotate by the drive device 81, this leads to a change in the length of the section of the threaded rod between the threaded nut and the drive device 81, and thus to the mast being pivoted relative to the chassis 21. This is illustrated in FIG. 8.

In order to arrange drive devices 8, 8' such as this in as space-saving a manner as possible in the vehicle 2, and in the process to achieve as uniform a load distribution as possible, it is advantageous to arrange the drive devices 8, 8' diagonally, as is illustrated in FIG. 7. In this case, the threaded spindles of the drive devices 8, 8' therefore run at an angle of 45° both with respect to the X direction and with respect to the Y direction.

An arrangement of the drive devices such as this requires an implementation of the control device 10 which, in the event of a change in the controlled variable $\theta_M$ with respect to the longitudinal or lateral direction of the vehicle, produces a simultaneous change in the manipulated variables for both spindle drives, since, for example, pivoting of the mast about the Y-axis requires simultaneous operation of both drive devices 8 and 8'. In a situation such as this, it is advantageous to use an appropriately designed MIMO controller, as has already been described above. Suitable controllers are known from the prior art. Alternatively, it is also feasible, as before, to use separate controllers for the X direction and the Y direction, but with the corresponding output variables being subjected to coordinate rotation of 45° or cross-correlation in order to obtain the manipulated variables for the drive devices 8 and 8' therefrom. Cross-correlation such as this is also familiar to a person skilled in the art from control engineering.

In the exemplary embodiment shown in FIGS. 6 to 8, it is also feasible to connect the drive device 81 to the telescopic mast 3 instead of to the vehicle chassis 21. In this case, it is advantageous to hold the threaded spindle 82 in a rotationally fixed manner on the chassis, while the drive device in this case drives a threaded nut which can rotate.

A multiplicity of further embodiments, both of the control device and of the actuator device, are, of course, possible. For example, it is also possible to use hydraulic or pneumatic drives instead of cable run systems or spindle drives driven by electric motor. Suitable hydraulic or pneumatic actuators have been known for a long time from the prior art. It goes without saying that all such actuator arrangements may be provided with a securing device of the type described above or of any other type.

Independently of the specific embodiment of the actuator device, it may be useful to detect not only the orientation of the mast 3 with respect to the absolute vertical in space, but to detect also the orientation of the vehicle 2. An optional further sensor device 22 can be provided for this purpose in the vehicle 2, as is indicated in FIG. 1. This detects the vehicle orientation relative to the vertical and supplies this as a further input variable to the controller C, which is then designed appropriately, as is indicated by the dashed arrow in FIG. 2. The knowledge of the vehicle orientation relative to the vertical allows the controller to readjust the controlled variable more quickly and in a more stable form to the reference variable than would be possible if the orientation of the vehicle were not known. This is particularly useful when the control system has been interrupted for a certain time as a result of the action of a securing device, as was described by way of example above.

It is evident from the above exemplary embodiments that a multiplicity of modifications are possible, and the invention is in no way restricted to the above exemplary embodiments. For example, the invention can be used in particular not just on land vehicles but also on marine vessels and other moving carriers.

The invention claimed is:

1. A system for stabilization of a mast on a movable carrier, comprising:

a mast which defines a longitudinal direction;

a mast support which is designed to support the mast on the carrier pivotably about at least one pivoting axis;

an actuator device which is connected to the mast and is designed to pivot the mast with its longitudinal direction relative to the carrier about the at least one pivoting axis;

a mast sensor device which is designed to determine the longitudinal direction of the mast relative to a predetermined absolute spatial direction;

an electronic control device which is designed to receive direction signals from the mast sensor device, to compare the direction signals with a predetermined set value for the longitudinal direction of the mast and to derive a manipulated variable from the comparison for the actuator device, in order to stabilize the longitudinal direction of the mast with respect to the set value; and a securing device for monitoring acceleration values of at least one of the mast and the carrier and to block the mast if a predetermined acceleration value is exceeded.

2. The system according to claim 1, wherein the securing device is in the form of a cable run system which comprises:

at least one securing cable which extends between the mast and the carrier, and at least one cable guide device on which the securing cable is guided and which blocks the cable if a predetermined acceleration value, which occurs on at least one of the mast and the carrier, is exceeded, such that further pivoting of the mast is prevented.

3. The system according to claim 2, wherein the cable guide device comprises at least one cable drum with a spring element, wherein the cable drum is connected to the carrier, and wherein the securing cable is adapted to be prestressed by means of the spring element.

4. The system according to claim 2, wherein the cable guide device comprises an electrically operable or mechanical clutch for blocking the securing cable.

5. The system according to claim 2, wherein the securing cable is connected to the mast above the mast support.

6. The system according to claim 1, wherein the mast support is designed such that it allows a pivoting movement of the mast about two mutually orthogonal pivoting axes, wherein the mast sensor device is designed to detect the longitudinal direction of the mast with respect to both pivoting axes, and wherein the actuator device is designed to pivot the mast about both pivoting axes.

7. The system according to claim 1, wherein the mast is a telescopic mast with a plurality of mast segments which are movable with respect to one another along the longitudinal direction.

8. The system according to claim 1, wherein the system additionally comprises a carrier sensor device which is designed to detect orientation of the carrier with respect to the predetermined absolute spatial direction, and wherein the control device is designed to additionally receive direction signals from the carrier sensor device, and to take them into account in determining the manipulated variable.

9. The system according to claim 1, wherein the actuator device has at least one cable run system which comprises:

at least one load cable which extends between the mast and the carrier, and at least one cable drive which is designed to drive the load cable to move such that the mast is pivoted with its longitudinal direction relative to the carrier.

10. The system according to claim 9, wherein the securing device comprises a clutch for the cable drive which blocks the load cable if a predetermined acceleration is exceeded.

11. The system according to claim 1, wherein the actuator device has at least one spindle drive, which comprises:

a threaded spindle a threaded nut; and a drive device which is designed to rotate the threaded spindle and the threaded nut relative to one another, such that the rotation results in the mast being pivoted relative to the carrier.

12. A vehicle comprising:

a mast which defines a mast longitudinal direction;

a mast support which is designed to support the mast on the vehicle pivotably about at least one pivoting axis;

an actuator device which is connected to the mast and is designed to pivot the mast with its mast longitudinal direction relative to the vehicle about the at least one pivoting axis;

a mast sensor device which is designed to determine the mast longitudinal direction relative to a predetermined absolute spatial direction;

an electronic control device which is designed to receive direction signals from the mast sensor device, to compare the direction signals with a predetermined set value for the mast longitudinal direction, and to derive a manipulated variable from the comparison for the actuator device, in order to stabilize the mast longitudinal direction with respect to the set value; and a securing device for monitoring acceleration values of at least one of the mast and the vehicle and to block the mast if a predetermined acceleration value is exceeded.

13. The vehicle according to claim 12, wherein the vehicle defines a vehicle longitudinal direction, and wherein the securing device is designed to block the mast with respect to pivoting movements along the vehicle longitudinal direction if a predetermined acceleration value is exceeded.

14. A method for stabilization of a mast on a movable carrier, the method comprising:

supporting the mast on the carrier by means of a mast support such that the mast is pivotable with respect to the carrier about at least one pivoting axis;

determining a longitudinal direction of the mast relative to a predetermined absolute spatial direction;

determining a manipulated variable for an actuator device by means of a closed-loop electronic control device which has, as input variables, at least the determined longitudinal direction of the mast and a predetermined set value for the longitudinal direction of the mast;

pivoting of the mast by means of an actuator device, which is connected to the mast and receives the manipulated variable from the closed-loop electronic control device, in order to stabilize the longitudinal direction of the mast relative to the predetermined set value;

monitoring of acceleration values of at least one of the mast and the carrier; and blocking of the mast with respect to pivoting movements if a predetermined acceleration value is exceeded.

15. The method of claim 14, further comprising:

taking action in the closed-loop electronic control device when the mast is blocked such that there is no drive for the actuators.

* * * * *